INVENTOR.
James Kantor,
BY
Hood & Hahn
ATTORNEYS

Nov. 2, 1948.   J. KANTOR   2,452,934
MECHANISM FOR APPLYING PLASTIC CROWNS TO CONTAINERS
Filed Feb. 7, 1944   3 Sheets-Sheet 3

INVENTOR.
James Kantor,
BY Hood & Hahn
ATTORNEYS

Patented Nov. 2, 1948

2,452,934

UNITED STATES PATENT OFFICE 2,452,934

MECHANISM FOR APPLYING PLASTIC CROWNS TO CONTAINERS

James Kantor, Chicago, Ill., assignor to The Liquid Carbonic Corporation, Chicago, Ill., a corporation of Delaware Original application January 11, 1943, Serial No. 471,986. Divided and this application February 7, 1944, Serial No. 521,321

4 Claims. (Cl. 226—86)

The present invention relates to improvements in apparatus for applying crowns to bottles and other containers.

One of the principal objects of the invention is to provide a crowning mechanism which is capable of handling the type of plastic crowns which have been developed to take the place of metal crowns heretofore used.

The present type of plastic crown is thermal plastic and as a result must be heated to render the same sufficiently plastic for molding about the neck of the container prior to its placement on the container. With the material of the crown rendered sufficiently soft by heat, the crown may then be molded about the container.

One of the objects of the present invention is to provide a mechanism for applying and securing the crown to the container while the crown is in its plastic stage.

More specifically, it is one of the objects of the invention to apply the crown to the neck of the container and mold the skirt of the crown around the bead of the bottle, maintaining the same in this position, until the crown has become set.

The present application is the division of my co-pending application, Serial No. 471,986, filed January 11, 1943, now Patent No. 2,432,163, issued December 9, 1947.

For the purpose of disclosing the invention I have illustrated embodiments thereof in the accompanying drawings, in which Fig. 1 is a front elevation of a crowning machine embodying my invention;

Figure 4:
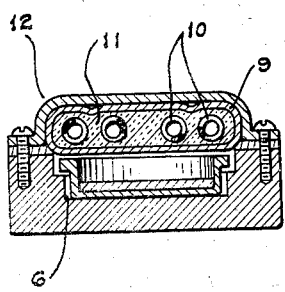
Fig. 4 is a transverse section of a portion of the crown chute showing the heating medium.
Figure 6:
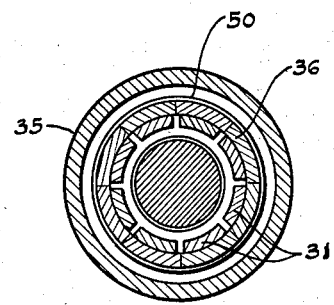
Fig. 6 is a sectional view taken on the line 6—6 of Fig. 5.

In the embodiment of the invention illustrated, I provide a rotary head 1 which is more or less of standard commercial form, which head is provided with a plurality of crowners 2 each of which is of the same construction and therefore a later description of one will be sufficient. Each of these crowners, as it moves into position over the receptacle to be crowned, due to the rotary movement of the head 1, is adapted to place a crown on the receptacle. The rotary head is provided with a crown hopper 3, which delivers through a selected mechanism 4 into the crown chute 5. Through the medium of the selected mechanism 4 the crowns are delivered, one at a time, into the chute with the open side of the crown in a position to be deposited in the crowning mechanism with the open side directed toward the receptacle to be crowned. This chute 5 is provided with a guiding groove 6, see Fig. 4, along which the crowns are adapted to slide by gravity and the chute is pivoted, as at 7, to the head to permit the lower end to swing in and out of position for delivering the crowns, one at a time, to a crown receiver of the mechanism. For directing the crowns into the mechanism, the lower end of the chute 5 has an inward curve, as at 8, with the delivery mouth of the chute disposed adjacent the crown receiver of the mechanism.

The chute groove 6 is covered by a suitable cover 9 which has arranged therein a series of resistance elements 10 adapted to be embodied in suitable insulating material 11. This cover is held in position on the chute through the medium of straps 12 which, at their outer extremities, are screwed or bolted to the chute proper. In practice, I find it advantageous to make this cover portion in two sections such as 13 and 14, each section being provided with suitable binding posts 15 to which suitable electric wires may be attached for energizing the heating elements 10 in the cover. By this arrangement, I am enabled to obtain zones of different temperatures throughout the length of the chute. Preferably, the upper zone has the highest heating capacity to quickly heat the crowner, the heat being maintained in the lower zone by the heating elements of that zone which has a lower heating capacity. It is to be noted that the chute 5 is given a decided offset bend, as at 16, so that the length of travel of the chute to its delivery point will be increased and so that the movement of the crowns through the chute will be somewhat retarded to permit more thorough heating of the crown prior to its delivery to the crowning mechanism. Furthermore, the heating elements are more closely adjacent the sides of the chute so that primarily the skirt of the crown is heated in preference to heating the entire crown. Also by providing the bend in the chute there is a tendency for the crown to rotate during its travel through the chute, thus more evenly distributing the heat. For controlling the heat to be applied to the crown, I preferably employ thermostatic controls (not shown) for controlling the circuit of the resistance elements.

Each of the heads 1 comprises a hollow cylindrical housing or support 17 carrying at its upper end a roller 18 adapted to engage a relatively stationary cam track 19 through the medium of which the housing 17 is adapted to be reciprocated vertically to move the crowning mechanism down to the crown receiving receptacle 20 which is vertically stationary. This receptable usually is in the form of a bottle and, for convenience hereinafter, will be referred to as a bottle.

Mounted within the housing 17 is arranged a hollow sleeve 21 which is adapted to be moved into a projected position through the medium of a coil spring 22 surrounding the sleeve and bearing at its upper end against a ring 23 seated on a shoulder 24 in the housing 17. The lower end of this spring bears on an annular flange 25 carried at the lower end of the sleeve 21. By this arrangement, the sleeve reciprocates with the housing 17 and can also move relatively thereto.

This housing 17, at its lower end, carries a crown receiver 26 which is provided with a central opening 28 of sufficient diameter to permit the passage therethrough of the neck of the bottle. The wall of this opening 28 has formed thereon an annular shoulder 29 to provide a crown support. The side wall of the receiver 26 is provided with an opening 30, through which the crowns may be fed from the delivery end of the chute on to the supporting shoulder 29. The walls of the opening 28 are flared, as at 27, to provide a bell shaped throat to guide the neck of the bottle into the opening 28. As the crown receiver moves downwardly with the housing 17, the neck of the bottle will pass through the opening 28 receiving a crown in its passage. It is to be understood that during the reciprocating movement of the crowning mechanism, the chute is swung outwardly to clear its lower end from the crowning mechanism.

Within the sleeve 21 is a crown moulding mechanism comprising a plurality of segmental members 31 which, together, form a complete circular contractible throat, the lower end of which tapers slightly outward as at 32 and terminates with an annular inturned lip 33 and an annular outward cammed surface 34. Surrounding this throat, and within the lower end of a screw threaded cap 35 on the sleeve 21, is a sleeve 36 which is locked against vertical movement by a collar 37 abutting against a shoulder on the cap 35 and against the lower end of the sleeve 21. The upper portion of the segmental moulding mechanism 31 is provided with a longitudinal groove 39 which receives an annular flange 40 on a plunger 41. This plunger 41 is mounted within the sleeve 21 and is biased in a downward direction through the medium of a coil spring 42 surrounding the plunger and bearing at its upper end against a shoulder in the sleeve 21 and at its lower end against an annular shoulder 43 on the plunger.

The sleeve 21 has longitudinal slots in its sides which receive a pair of retaining dogs 44 pivoted at 45 to the sleeve and having their noses 46 adapted to engage in a groove formed between the rings 23. Normally the sleeve is maintained in its raised position against the influence of the coiled spring 22 through the engagement of the dogs in the notch formed in the rings 23. These dogs are maintained in their engaging positions through a head 47 of the plunger 41 which fits between the upper portions of the dog and is held in this position through the influence of the coiled spring 42.

Figure 3:
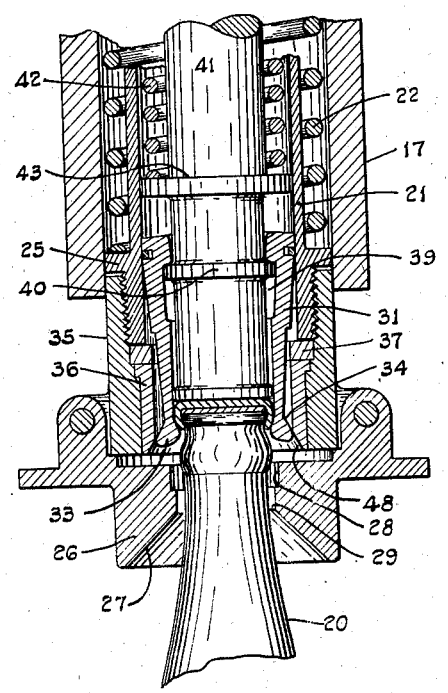
Fig. 3 is a longitudinal sectional view of a portion of the crown mechanism showing the crown in position on the container to be sealed.

In operation, while the crown mechanism is in its raised position a heated crown is delivered on the seat 29 of the crown receiver. Immediately after the heated, and thus softened crown, is delivered in position, the housing 17 commences to descend. This moves the crowning mechanism down over the bottle 20 until the bottle has passed through the opening of the crown receiver and into the crown forcing the crown, now seated on the top of the bottle, against the plunger 41 arresting the downward movement of the plunger but permitting the continued downward movement of the housing 17 with the crowning throat thereby moving the portion 47 of the plunger from between the dogs 46, releasing the dogs and permitting the sleeve 21, under the influence of the coiled spring 22 and the downward movement of the housing 17, to be forced downwardly thereby moving the crown throat downwardly to surround the neck of the bottle. The continued downward movement of the housing 17 engages the cam sides 48 of the sleeve 36 with the cam portion 34 of the throat contracting the throat and forcing the segments of the throat inward, causing the lips 33 to engage the sides of the crown, as illustrated in Fig. 3, molding the sides of the crown around the lip of the bottle. There is a sufficient pause after this has been accomplished and during the upward movement of the housing 1 to permit the plastic crown to seat in this position. Due to the fact that the lip 33 on the crown throat moves in beneath the edge of the crown and squeezes the edge around the bead of the bottle retaining the same in this position, with the sides of the throat bearing against the sides of the crown and preventing the crown from cold flowing or spreading out as the plastic material under the bead is forced in position. By the time the parts are ready to move to their upward position, thus releasing the structure, the crown has become sufficiently cooled, due to the lapse of time and also due to the absorption of the heat from the crown by the crown throat, the crown is set in position on the neck of the bottle.

With the plunger 41 in its normal or projected position, the annular flange 40 is at the bottom of the recess or groove 39 of each of the segments 31 forming the contractible crown receiving throat. Therefore, this throat is maintained in its expanded position. As the container, with its positioned crown, moves into the throat, it forces the plunger 41 upwardly, thereby moving the flange 40 upwardly in the grooves 39 until the flange 40 is substantially at the top of the segments 31. Due to the fact that the flange 40 is so close to the top of the segments 31, the lower ends of these segments may swing inwardly under the camming action of the ring or sleeve 36. It is thus apparent that the segments 31 are maintained in their expanded position until the bead of the bottle or container has moved into the throat, formed by the segments to a point beyond the inturned lips 33.

Figure 1:
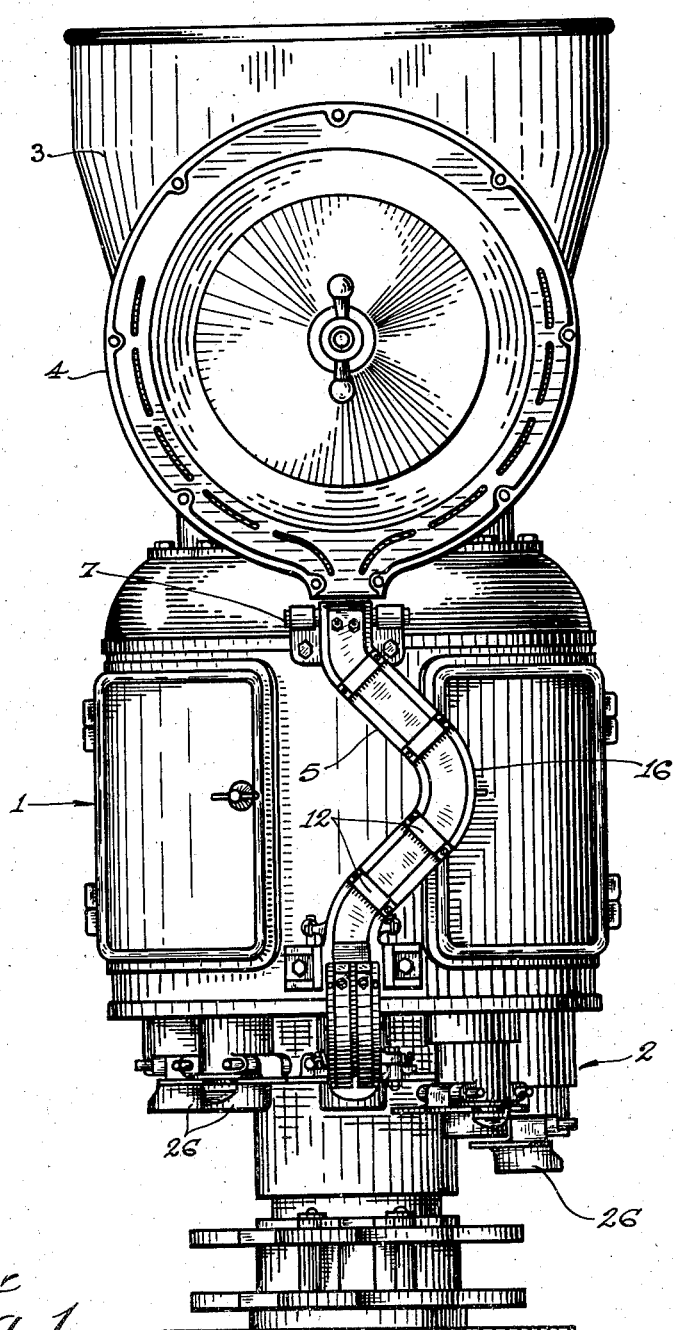
Figure 2:
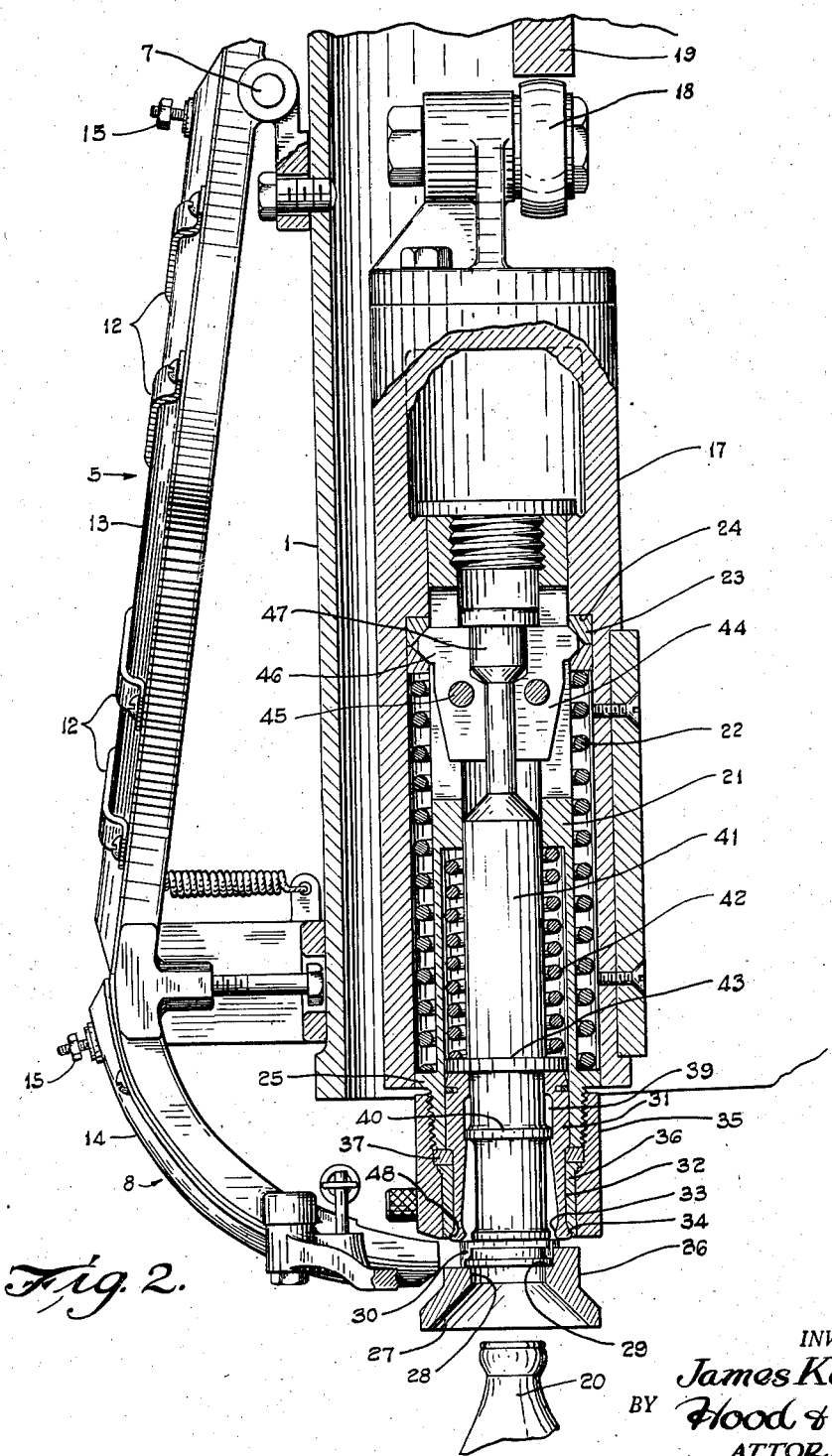
Fig. 2 is a longitudinal sectional view of the crown applying mechanism showing the crown chute.
Figure 5:
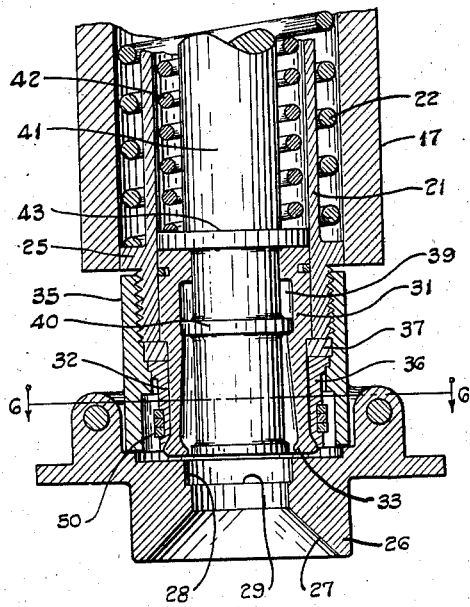
Fig. 5 is a detailed longitudinal section of a modification of the crown applying mechanism.

In Fig. 5 I have illustrated a modification of the structure illustrated in the remaining figures. It will be noted in the structure illustrated in Figs. 2 and 3, the ring 36 is a solid ring. In the structure illustrated in Fig. 5 this ring is formed of a plurality of segments, which together form a complete ring. The segments are held in position by a suitable retaining spring 50. In other respects, the structure illustrated in Fig. 5 is substantially the same as that illustrated in Fig. 2. Due to this arrangement the crown throat will more readily adjust itself to the tops of the bottles, especially where there is a slight variation in the size of the tops of the bottles. However, the surrounding springs 50 are sufficiently powerful to exert a closing pressure and cause the throat to collapse about the crown as is done in the structure illustrated in Figs. 1 and 3.

I claim as my invention:

1. In a receptacle crowning apparatus, in combination, a crowning throat comprising a plurality of elongated segments arranged about a common axis, each rockable on a horizontal axis to move the lower ends of said segments toward and away from said common axis and each of said segments having an inturned lip at its lower end and thus providing a capping throat for receiving the neck of a container expandible and contractible at its lower end, said throat and receptacle being reciprocable relatively to one another, a plunger reciprocable in said throat and engageable with a crown on a receptacle, means on said plunger for normally maintaining said throat in its expanded condition and movable with said plunger as it moves relatively to said throat to release said segments to permit said throat to contract, and means for contracting said throat after said segments have been released.

2. In a receptacle crowning apparatus, in combination, a sleeve, a crown crimping throat comprising a plurality of lever arms rockably supported within said sleeve about the axis of said sleeve, each of said lever arms having an inturned lip at its lower end and forming an expandible and contractible throat, a plunger reciprocable within said throat and an annular shoulder on said plunger normally engaging said levers at a point beyond their rocking points to maintain said throat in its expanded position and movable with said plunger to a point adjacent the rockable points of the levers to permit the lower end of said levers to move toward the axis of said throat to contract the same, and means for moving the lower ends of said levers inwardly when released by said plunger.

3. In a receptacle crowning apparatus, in combination, a crowning throat comprising a plurality of elongated segments arranged about a common axis and each rockable on a horizontal axis to move the lower ends of said segments towards and from said common axis to move an expandible and contractible throat, each of said segments having an inturned lip at its lower end, means associated with said throat for maintaining a crown on the receptacle to be crowned, means operated by said maintaining means for holding said throat in its expanded condition for a predetermined period and means for contracting said throat after said holding means has released the same.

4. In a receptacle crowning machine for applying crowns having a down-turned skirt to the neck of a container having an annular bead thereon, in combination, a reciprocating supporting member, a crown receiver supported at the lower end of said reciprocating supporting member, said crown receiver having an opening therethrough, a crown rest on said crown receiver surrounding said opening whereby as the container is projected through the opening the crown will be deposited thereon, a plunger operated by the reciprocating movement of said reciprocating supporting member for clamping the crown upon the top of the receptacle, a contractable throat movable by the reciprocation of said reciprocating suporting member to receive the crown and the neck of the receptacle, said contractable throat comprising a plurality of segments surrounding said plunger, each of said segments having at its lower end an inturned lip, means on said plunger for normally holding said segments radially outward, and reciprocating means movable relatively to said segments and engaging the lower ends of said segments for moving the same inwardly, said means on said plunger for holding the segments outwardly being simultaneously movable to release said segments and permitting the inward movement thereof.

JAMES KANTOR.

REFERENCES CITED

The following references are of record in the file of this patent:

UNITED STATES PATENTS

| Number | Name | Date |
| --- | --- | --- |
| 1,078,607 | Calleson | Nov. 18, 1913 |
| 1,094,163 | Nissinen et al. | Apr. 21, 1914 |
| 2,146,347 | Pityo | Feb. 7, 1939 |
| 2,169,804 | Kniesche | Aug. 15, 1939 |
| 2,274,583 | Baum | Feb. 24, 1942 |
| 2,325,050 | Goodwin | July 27, 1943 |
| 2,325,086 | Vore | July 27, 1943 |
| 2,325,309 | De Swart | July 27, 1943 |